United States Patent Office

3,741,925
Patented June 26, 1973

---

3,741,925
WATER-REPELLENT ETHYLENE COPOLYMER DISPERSIONS
John William McDonald, Memphis, Tenn., assignor to E. I. du Pont de Nemours and Company, Wilmington, Del.
No Drawing. Filed Apr. 2, 1971, Ser. No. 130,842
Int. Cl. C08f 45/52, 45/24; C08j 1/40
U.S. Cl. 260—28.5 R                     14 Claims

---

ABSTRACT OF THE DISCLOSURE

An aqueous ethylene copolymer dispersion, from which an improved water-repellent coating can be applied, is provided. The dispersion comprises an ethylene copolymer, an ammonium salt of a mineral acid, and from 0 to 25 percent by weight, based on solids weight, of an amino-formaldehyde resin. An article having thereon a coating of the dispersed phase of the dispersion and a process for preparing the article are also provided.

---

BACKGROUND OF INVENTION

Field of invention

This invention relates to stable aqueous dispersions of ethylene copolymers and, more particularly, to dispersions of ethylene copolymers and waxes.

Prior art

Textile water repellents, which are known in the art, are substances which deposit a hydrophobic coating on textile materials, e.g., woven and non-woven fabric. Desirable coatings prevent water penetration of the fabric, cause water to run off the fabric, and allow essentially free passage of air through the fabric.

There are basically two types of textile water-repellent coatings: (I) those having poor to medium wash fastness (wax, resin, pyridinium or silicone based), and (II) those having excellent wash fastness (fluorocarbon based). Although type (I) water-repellent coatings do not have the wash fastness of the type (II) coatings, type (I) coatings are often preferred. For example, type (I) coatings are usually more economical.

Aqueous dispersions from which type (I) water-repellent coatings can be applied are described in U.S. Pat. No. 3,347,811, issued to T. C. Bissot on Oct. 17, 1967, and U.S. Pat. No. 3,296,172, issued to D. L. Funck and V. C. Wolff, Jr., on Jan. 3, 1967 Although these coatings are useful and have good water-repellent characteristics, a type (I) water repellent having completely satisfactory water-repellent characteristics, such as initial water repellency and durability to washing, has not yet been provided.

Accordingly, it would be desirable to have a type (I) water repellent having improved initial water repellency and improved durability to washing.

SUMMARY OF INVENTION

According to the present invention, there is provided an aqueous dispersion comprising as essential ingredients: an ethylene copolymer comprising at least 30 percent by weight ethylene and up to 70 percent by weight of at least one comonomer having polar characteristics, a wax, an ammonium salt of a mineral acid, and from 0 to 25 percent by weight, based on solids weight, of an amino-formaldehyde resin.

There is also provided an article having thereon a coating of the dispersed phase of the above-identified dispersion. This coating has improved water-repellent characteristics such as improved initial water repellency and improved durability to washing.

There is also provided a process for preparing an article having thereon a water-repellent coating comprising applying to the article an aqueous dispersion comprising as essential ingredients: an ethylene copolymer comprising at least 30 percent by weight ethylene and up to 70 percent by weight of at least one comonomer having polar characteristics, a wax, an ammonium salt of a mineral acid, and from 0 to 25 percent by weight, based on solids weight, of an aminoformaldehyde resin; and heating the article at a temperature greater than about 100° C. until the coating is sufficiently dry.

DETAILED DESCRIPTION OF INVENTION

The ethylene copolymers useful in the present invention have an ethylene content of at least 30 percent by weight, preferably 30 to 95 percent by weight, and up to 70 percent by weight, preferably 70 to 5 percent by weight, of at least one comonomer having polar characteristics. These ethylene copolymers are described in U.S. Pat. No. 3,347,811. Among others, examples of monomers having polar characteristics are: vinyl esters of carboxylic acids such as vinyl formate, vinyl acetate, vinyl propionate and vinyl butyrate; unsaturated carboxylic acids such as acrylic acid, methacrylic acid, itaconic acid and maleic acid; acrylates and methacrylates such as ethyl acrylate, isobutyl acrylate and methyl methacrylate; halogenated vinyl compounds such as vinyl chloride, vinylidene chloride and vinyl alcohol (hydrolyzed vinyl acetate); acrylamide, β-dimethyl-aminoethyl methacrylate, β-hydroxyethyl acrylate and other adhesion-promoting monomers having carboxyl, amido, amino or hydroxyl groups.

One particularly preferred copolymer is a copolymer of ethylene and vinyl acetate having at least 60 percent by weight ethylene, 17 to 40 percent by weight vinyl acetate and 0 to 5 percent by weight of an alpha, beta-ethylenically unsaturated carboxylic acid, such as acrylic acid or methacrylic acid. Such copolymers are generally prepared by high-pressure free-radical catalysis processes, but they can also be prepared by low-pressure coordination catalysis processes. The molecular weight can be varied over a wide range; however, copolymers having molecular weights corresponding to melt indexes of 1 to 150, particularly under 15, are especially suited for use in this invention. Copolymer melt index is determined as described in ASTM–D–1238–65T.

Another particularly preferred copolymer is a copolymer of ethylene and an alpha, beta-ethylenically unsaturated carboxylic acid having at least 60 percent, preferably 80 percent, by weight ethylene and 0.3 to 40 percent, more preferably 3 to 40 percent, and most preferably 3 to 20 percent by weight acid. Preferably, the acid has from 3 to 8 carbon atoms. Suitable acids are the mono- and di-carboxylic acids such as acrylic acid, methacrylic acid, fumaric acid, maleic acid, itaconic acid and aconitic acid. Acid derivatives of the aforesaid, such as esters, amides, anhydrides and the like, also can be employed as monomers.

Dispersions of these ethylene copolymers can be prepared as described in U.S. Pat. No. 3,296,172. When an ethylenically unsaturated carboxylic acid comonomer is present in the copolymer, about 5 to 75 percent of the acid groups can be neutralized with an alkali metal ion, e.g., sodium or potassium as described in U.S. Pat. 3,296,172.

It is preferred that the ethylene copolymer be present in the dispersion in an amount from about 4 to 95, more preferably 4 to 50, and most preferably 8 to 28, percent by weight, based on solids weight.

The waxes suitable for the practice of this invention can be of natural, mineral, petroleum or synthetic origin.

Natural waxes include beeswax, woolwax, Japan wax, myrtle, mace, palm kernel, spermaceti, carnauba, candelila, and bayberry; mineral waxes include materials such as Montan wax and paraffin waxes from shale oils or coal; petroleum waxes include both the paraffin and microcrystalline types; and synthetic waxes include halogenated hydrocarbons, e.g., chlorinated paraffins, polyethylene wax, alpha-olefin waxes, and Fischer-Tropsch waxes.

Preferred waxes are the paraffin waxes of petroleum origin. These materials are normally very difficult to convert into stable aqueous dispersions without downgrading many of their inherent desirable properties. These waxes are mixtures of solid hydrocarbons derived from the overhead wax distillate fraction obtained from the fractional distillation of petroleum. After purification, the paraffin wax contains hydrocarbons that fall within the formulas $C_{23}H_{48}$ to $C_{35}H_{78}$. The waxes are hard, colorless and translucent materials having melting points generally in the range from about 120 to 200° F., preferably 120 to 180° F.

Preferred chlorinated paraffin waxes are the chlorinated, saturated hydrocarbons of the $C_{10}$ to $C_{30}$ range having a chlorine content of 40 to 70%, as described by Hardie, "Chlorinated Hydrocarbons," in 5 Encyclopedia of Chemical Technology 231 (Kirk-Othmer 2nd ed. 1964). Depending upon their chlorine content, these chlorinated paraffins have melting points from −30° C. (42 percent chlorine) to 90° C. (70 percent chlorine).

An aqueous dispersion containing wax and ethylene copolymer can be prepared by simply mixing an aqueous dispersion containing the wax, which can be prepared by any conventional method known in the art, with an aqueous dispersion containing an ethylene copolymer or by codispersing the wax with the ethylene copolymer using the solvent systems and technique disclosed in U.S. Pat. No. 3,296,172.

It is preferred that the wax be present in the dispersion in an amount from about 95 to 4, more preferably 94 to 38, and most preferably 85 to 65, percent by weight, based on solids weight.

The ammonium salt of a mineral acid is added to the ethylene copolymer and wax dispersion as an aqueous solution, preferably, in an amount from about 1 to 25, more preferably, 5 to 15, percent by weight, based on solids weight.

When the dispersion contains an ethylene copolymer comprising an ethylenically unsaturated carboxylic acid moiety at least partially neutralized with alkali metal ions, e.g., in an amount from about 10 to 90 percent, it is preferred to use an amount of the ammonium salt greater than the molar concentration of alkali metal ions in the dispersion.

Preferred ammonium salts are ammonium halide, such as ammonium chloride and ammonium bromide, ammonium nitrate, ammonium sulfate, and ammonium phosphate.

Amino formaldehyde resins can also be added to the dispersions and provide increased durability of coatings applied from the dispersions to washing. The amino-formaldehyde resins are those which are generally known in the art and commercially available. Preferred amino-formaldehyde resins are melamine-formaldehyde, e.g., hexamethoxy methyl melamine, and urea-formaldehyde. These resins are employed in the dispersion at a level from 0 to 25, more preferably from 1 to 15, and most preferably from 2 to 10, percent by weight, based on solids weight. Above about 25 percent by weight, the unreacted portion of an excess of amino-formaldehyde may act as a plasticizer and decrease the water and solvent resistance of coatings applied from the dispersions.

To the dispersions of this invention can also be added rosin and resin derivatives, mineral fillers and pigments, according to particular formulation needs, without detracting from the utility of the instant invention.

The articles which can be coated by the dispersions of the invention, include textile materials such as natural or synthetic textile fibers in the form of woven fabrics, nonwoven webs or sheets, fiberfill and strings, strands or ropes. Coated fiberfills are particularly preferred since they can be advantageously used in the automotive industry and in tent canvas.

In a preferred process for coating the article, the article is coated with the dispersion of this invention and heated at a temperature greater than about 100° C. until the water is vaporized and the coating is cured. Preferably, the article is heated at a temperature between about 100–200° C. for at least 1 minute and, more preferably, for at least 3–5 minutes. The article can be heated for a longer period of time, but should not be heated to the extent that the article or coating thereon is damaged. Although satisfactory coatings can be obtained by heating the article having the coating thereon for about 1 minute, better results are obtained by heating the article for about 3–5 minutes. For example, see Table II.

Conventional ethylene copolymer dispersions can be used to form coatings having a degree of water repellency. However, addition of the ammonium salts of mineral acids of this invention greatly improves the degree of water repellency. For example, as shown in Table I, the spray rating of a coating applied from an ethylene copolymer dispersion was increased from about 70–90 to 100 by addition of an ammonium salt. Furthermore, as shown in Table II, addition of amino-formaldehyde resin increases the durability of the coating to washing.

The invention is further illustrated by the controls and examples which are set forth in Tables I and II, in which parts and percentages are by weight unless otherwise indicated.

In the tables, degree of water repellency was determined by the ASTM (D-583-63) Spray Test. This test measures the amount of wetting that occurs as 250 ml. of water is permitted to spray on a test fabric at a 45-degree angle. A rating of 100 signifies no water sticking on or wetting the fabric surface. A rating of 50 means complete wetting of the fabric surface, but no water penetrating to the other side of the fabric. A rating of 0 means complete saturation of the test fabric.

The test fabric was prepared for the spray test in Table I as follows: the fabric was dried in a circulating air oven at 160° C. for 1 minute, saturated with water, passed through a wringer to remove excess water, saturated in a bath formulation as described in Table I for 30 seconds, padded with paper towels, passed through a wringer at 5 lb. roll pressure, and dried at 160° C. for 2–3 minutes in a circulating air oven.

The test fabric was prepared for the spray tests in Table II as follows: the fabric was saturated with water, padded with paper towels, passed through a wringer to remove excess water, soaked in a bath formulation as described in Table II for 30 seconds, again padded with paper towel, passed through a wringer at 5 lb. roll pressure, dried in a circulating air oven at 160° C. for the time designated in Table II, and passed through a drum dryer at 98° C. for 30 seconds.

The coated fabrics were washed, using a 9-minute cold water cycle in the presence of a detergent and dried by two passes through the drum dryer.

Bath formulations for Controls 1–21, 23–26, and 32–36 were prepared by dispersing the polymer and/or wax in water. Bath formulations for Controls 22 and 27–31 were prepared by dispersing the polymer and wax in water and then adding amino-formaldehyde resin to the dispersion. Bath formulations for Examples 1–16, 21, 24–26, 30, and 33–34 were prepared by dispersing the polymer and wax in water, adding the amino-formaldehyde resin, and then adding ammonium salt solution. Bath formulations for Examples 17–20, 22–23, 27–29, 31–32, and 35 were prepared by dispersing the polymer and wax in water and then adding ammonium salt solution. Bath solids were approximately in the 2 percent range, which typically resulted in a solids pickup on the fabric of 1–2 percent by weight based on fabric weight.

In the Controls and Examples, Ionomer (11% acid) is an 89/11 ethylene/methacrylic acid copolymer wherein the acid constituent is about 50 percent neutralized, "Elvax" 260 is a 28/72 ethylene/vinyl acetate copolymer, "Cymel" 301 is hexamethoxymethyl melamine which is sold commercially by American Cyanamid Co., "Norane" 255 is an anionic wax emulsion sold by Sun Chemical Corporation, "Paracol" 404G is a wax emulsion sold by Hercules, Inc., "Warco" 377 is a wax-aluminum emulsion sold by Sun Chemical Corporation, and "Impregnole" FH is a zirconium-wax complex sold by Sun Chemical Corporation.

TABLE I.—WATER-REPELLENT FINISHES

| | Bath formulation | | | | | |
|---|---|---|---|---|---|---|
| | Polymer/wax | | | | | |
| | Composition | Weight (g.) | Amino-formaldehyde (g.) | Ammonium salt 10% sol. (ml.) | ASTM (D-583-63) spray test | Fabric |
| Control: | | | | | | |
| 1 | 15/85 ionomer (11% acid)/wax | 2 | | | 70 | Cotton. |
| 2 | {do / 85/15 ethylene/methacrylic acid a} | {1.5 / 0.5} | | | 90 | Do. |
| 3 | {15/85 ionomer (11% acid)/wax / 89/11 ethylene/methacrylic acid a} | {1.5 / 0.5} | | | 70 | Do. |
| 4 | {15/85 ionomer (11% acid)/wax / 89/11 ethylene/methacrylic acid a} | {1 / 1} | | | 0 | Do. |
| 5 | 67/33 ionomer (11% acid)/wax c | 2 | | | 0 | Do. |
| 6 | 85/15 ethylene/methacrylic acid b | 2 | | | 0 | Do. |
| 7 | 67/33 ethylene/vinyl acetate copolymer | 2 | | | 0 | Do. |
| 8 | {75/25 ethylene/vinyl acetate / 15/85 ionomer (11% acid)/wax} | {1 / 1} | | | 70 | Do. |
| 9 | 43/42/15 "Elvax" 260/wax/ionomer (11% acid) | 2 | | | 50 | Do. |
| 10 | "Norane" 255 | 2 | | | 50 | |
| 11 | "Paracol" 404G | 2 | | | 50 | |
| 12 | "Warco" A-377 | 2 | | | 70 | |
| 13 | "Impregnole" FH | 2 | | | 80 | |
| 14 | 15/85 ionomer (11% acid)/wax | 2 | | | 0 | 65/35 Dacron/cotton. |
| 15 | do | 2 | | | 50 | Acetate. |
| 16 | do | 2 | "Cymel" 301 (0.25) | | 70 | Cotton. |
| Example: | | | | | | |
| 1 | 15/85 ionomer (11% acid)/wax | 2 | do | NH4Br (1) | 100 | Do. |
| 2 | 43/25 "Elvax" 260/wax/ionomer (11% acid) (4) | 2 | do | NH4Br (1) | 80 | Do. |
| 3 | {15/85 ionomer (11% acid)/wax / 89/11 ethylene/methacrylic acid d} | {1 / 1} | do | NH4Br (1) | 70 | Do. |
| 4 | {15/85 ionomer (11% acid)/wax / 89/11 ethylene/methacrylic acid d} | {1 / 1} | "Cymel" 301 (0.5) | NH4Br (2) | 50 | Do. |
| 4 | {15/85 ionomer (11% acid)/wax / 85/15 ethylene/methacrylic acid a} | {1.5 / 0.5} | "Cymel" 301 (0.2) | NH4Br (6) | 100 | Do. |
| 5 | {15/85 ionomer (11% acid)/wax / 18/15 ethylene/methacrylic acid a} | {1 / 1} | do | NH4Br (6) | 70 | Do. |
| 7 | 15/85 ionomer (11% acid)/wax | 2 | "Cymel" 301 (0.25) | NH4Br (1) | 100 | Do. |
| 8 | do | | do | NH4Br (2) | 100 | Do. |
| 9 | do | | do | NH4Br (4) | 100 | Do. |
| 10 | do | | "Cymel" 301 (0.1) | NH4Br (2) | 100 | Do. |
| 11 | do | | "Cymel" 301 (0.4) | NH4Br (2) | 100 | Do. |
| 12 | do | | "Cymel" 301 (0.8) | NH4Br (2) | 80 | Do. |
| 13 | do | | "Cymel" 301 (0.4) | NH4Br (4) | 100 | Do. |
| 14 | do | | "Cymel" 301 (0.8) | NH4Br (4) | 90 | 65/35 dacron/cotton. |
| 15 | do | | "Cymel" 301 (0.25) | NH4Br (2) | 100 | Acetate. |
| 16 | do | | do | NH4Br (2) | 100 | Cotton. |
| 17 | do | | do | NH4Br (1) | 100 | Do. |
| 18 | do | | do | NH4Br (4) | 100 | Do. |
| 19 | do | | do | NH4Br (8) | 100 | Do. |
| 20 | do | | do | (NH4)2HPO4 (2) | 100 | Do. | a 15% of acid groups neutralized.  b 60% of acid groups neutralized.  c 70% of acid groups neutralized.  d 0% of acid groups neutralized.

TABLE II.—WASH DURABILITY OF WATER-REPELLENT FINISHES

| | Bath formulation | | | | Drying cond., 160° C./min. | ASTM spray rating (D-583-63) | | | | |
|---|---|---|---|---|---|---|---|---|---|---|
| | Polymer/wax | | | | | | | | | |
| | Composition | Weight (g.) | Amino-formaldehyde (g.) | Ammonium salt 10% sol. (ml.) | | Initial | 1st wash | 2d wash | 5th wash | Fabric |
| Control: | | | | | | | | | | |
| 17 | 15/85 ionomer (11% acid)/wax | 4 | | | 3 | 80 | 70 | 50 | 0 | Cotton. |
| 18 | do | 2 | | | 1 | 70 | 0 | | | Do. |
| 19 | do | 2 | | | 3 | 80 | 0 | | | Do. |
| 20 | do | 2 | | | 5 | 90 | 50 | | | Do. |
| 21 | do | 3 | "Cymel" 301 (0.1) | | 3 | 80 | 70 | 50 | 0 | Do. |
| 22 | do | 3 | "Genepoxy" (0.1) | | 3 | 80 | 70 | 50 | 0 | Do. |
| 23 | do | 2 | "Cymel" 301 (0.2) | | 3 | 80 | 70 | 50 | 0 | Do. |
| 24 | do | 2 | "Genepoxy" (0.2) | | 3 | 80 | 70 | 50 | 0 | Do. |
| 25 | do | 2 | "Genepoxy" (0.8) | | 3 | 90 | 70 | 50 | 0 | Do. |
| 26 | 15/85 E/VAc ("Elvax" 260)/Wax | 2 | | | 3 | 90 | 80 | 70 | | Do. |
| 27 | "Warco" A-377 | 2 | | | 3 | 90 | 0 | | | Do. |
| 28 | do | 4 | | | 3 | 100 | 50 | 0 | | Do. |
| 29 | "Paracol" 404G | 2.5 | | | 3 | 50 | 0 | | | Do. |
| 30 | do | 5 | | | 3 | 50 | 0 | | | Do. |
| Example: | | | | | | | | | | |
| 21 | 15/85 ionomer (11% acid)/wax | 3 | "Cymel" 301 (0.05) | NH4Br (0.5) | 3 | 90 | 80 | 70 | 50 | Do. |
| 22 | do | 3 | | NH4Br (1) | 3 | 100 | 80 | 80 | 0 | Do. |
| 23 | do | 3 | | (NH4)2HPO4 (1) | 3 | 100 | 80 | 70 | 0 | Do. |
| 24 | do | 2 | "Cymel" 301 (0.02) | NH4Br (2) | 3 | 100 | 90 | 90 | 70 | Do. |
| 25 | do | 2 | do | NH4Br (2) | 3 | 100 | 100 | 70 | 50 | Do. |
| 26 | do | 2 | do | (NH4)2HPO4 (2) | 3 | 90 | 80 | 70 | 50 | Do. |
| 27 | do | 2 | | NH4Br (2) | 3 | 100 | 70 | 50 | 0 | Do. |
| 28 | do | 2 | | (NH4)2HPO4 (2) | 1 | 90 | 80 | 50 | 0 | Do. |
| 29 | do | 2 | | (NH4)2HPO4 (2) | 5 | 100 | 80 | 70 | 0 | Do. |
| 30 | do | 1 | "Cymel" 301 (0.15) | NH4Br (1.5) | 3 | 100 | 90 | 50 | 0 | Do. |
| 31 | do | 1 | | NH4Br (3) | 3 | 100 | 80 | 50 | 0 | Do. |
| 32 | do | 1 | | (NH4)2HPO4 (3) | 3 | 100 | 80 | 50 | 0 | Do. |
| 33 | do | 2 | "Cymel" 301 (0.2) | NH4Br (2) | 1 | 80 | 80 | 50 | 0 | Do. |
| 34 | do | 2 | do | NH4Br (2) | 5 | 100 | 100 | 90 | 50 | Do. |
| 35 | 15/85 E/VAc ("Elvax" 260)/wax | 2 | | NH4Br (2) | 3 | 100 | 80 | 70 | 0 | Do. |

What is claimed is:

1. An aqueous dispersion comprising as essential ingredients in amounts based on solids weight: 4 to 95 percent by weight of ethylene copolymer comprising at least 30 percent by weight of ethylene and up to 70 percent by weight of comonomer having polar characteristics, 4 to 95 percent by weight of wax, 1 to 25 percent by weight of ammonium salt of mineral acid, and 0 to 25 percent by weight of amino-formaldehyde resin.

2. The dispersion of claim 1 wherein said ethylene copolymer comprises at least 60 percent by weight ethylene and said comonomer having polar characteristics is vinyl acetate and/ or an alpha,beta-ethylenically unsaturated carboxylic acid.

3. The dispersion of claim 2 wherein said comonomer having polar characteristics is an alpha,beta-ethylenically unsaturated carboxylic acid having about 5 to 75 percent of the acid groups neutralized with alkali metal ions.

4. The dispersion of claim 3 wherein said ammonium salt of a mineral acid is present in an amount greater than the molar concentration of alkali metal ions in the dispersion.

5. The dispersion of claim 1 wherein said ammonium salt is ammonium halide, ammonium chloride, ammonium bromide, ammonium nitrate, ammonium sulfate or ammonium phosphate and said amino-formaldehyde resin is a melamine-formaldehyde or urea-formaldehyde.

6. An aqueous disersion comprising as essential ingredients: from about 4 to 95 percent by weight, based on solids weight, of an ethylene copolymer comprising at least 60 percent by weight ethylene and up to 40 percent by weight of at least one comonomer of vinyl acetate or an alpha,beta-ethylenically unsaturated carboxylic acid, from about 95 to 4 percent by weight, based on solids weight of a wax, from about 1 to 25 percent by weight, based on solids weight, of an ammonium salt of a mineral acid, and from 0 to 25 percent by weight, based on solids weight, of an amino-formaldehyde resin.

7. The dispersion of claim 1 wherein said ethylene copolymer is present in the amount of 4 to 60 percent by weight, and said wax is present in the amount of 94 to 38 percent by weight.

8. The dispersion of claim 7 wherein said ethylene copolymer is present in the amount of 8 to 28 percent by weight, said wax is present in the amount of 85 to 65 percent by weight, and said ammonium salt is present in the amount of 5 to 15 percent by weight.

9. The dispersion of claim 1 wherein said ethylene copolymer comprises 30 to 95 percent by weight of ethylene and 5 to 70 percent by weight of comonomer having polar characteristics.

10. The dispersion of claim 2 wherein said ethylene copolymer comprises 17 to 40 percent by weight of vinyl acetate and 0 to 5 percent by weight of acrylic or methacrylic acid.

11. The dispersion of claim 10 wherein the ethylene copolymer has a melt index of 1 to 150.

12. The dispersion of claim 11 wherein the ethylene copolymer has a melt index under 15.

13. The dispersion of claim 2 wherein said ethylene copolymer contains 0.3 to 40 percent by weight of alpha, beta-ethylenically unsaturated carboxylic acid.

14. The dispersion of claim 13 wherein said ethylene copolymer comprises at least 80 percent by weight of ethylene and 3 to 20 percent by weight of alpha,beta-ethylenically unsaturated carboxylic acid having 3 to 8 carbon atoms.

References Cited
UNITED STATES PATENTS

| | | | |
|---|---|---|---|
| 3,296,172 | 1/1967 | Funck et al. | 260—34.2 |
| 3,347,811 | 10/1967 | Bissot | 260—34.2 |
| 3,389,109 | 6/1968 | Harmon et al. | 260—29.6 H |
| 3,394,097 | 7/1968 | Bissot | 260—285 AV |
| 3,437,626 | 4/1969 | Glabisch | 260—29.6 H |
| 3,540,917 | 11/1970 | Seifer et al. | 117—135.5 |
| 3,578,617 | 5/1971 | Louis et al. | 117—135.5 |

MORRIS LIEBMAN, Primary Examiner

S. L. FOX, Assistant Examiner

U.S. Cl. X.R.

117—135.5, 139.5 CQ; 260—28.5 AV, 29.6 H